United States Patent
Zhang et al.

(10) Patent No.: US 11,905,816 B2
(45) Date of Patent: Feb. 20, 2024

(54) CASING THICKNESS ESTIMATION BY FREQUENCY CORRELATION

(71) Applicant: Halliburton Energy Services, Inc., Houston, TX (US)

(72) Inventors: Zhijuan Zhang, Houston, TX (US); Nazareth Bedrossian, Dickinson, TX (US)

(73) Assignee: Halliburton Energy Services, Inc., Houston, TX (US)

(*) Notice: Subject to any disclaimer, the term of this patent is extended or adjusted under 35 U.S.C. 154(b) by 956 days.

(21) Appl. No.: 16/062,051

(22) PCT Filed: Mar. 3, 2016

(86) PCT No.: PCT/US2016/020632
§ 371 (c)(1),
(2) Date: Jun. 13, 2018

(87) PCT Pub. No.: WO2017/151133
PCT Pub. Date: Sep. 8, 2017

(65) Prior Publication Data
US 2018/0363446 A1 Dec. 20, 2018

(51) Int. Cl.
*E21B 47/00* (2012.01)
*G01V 1/50* (2006.01)
(Continued)

(52) U.S. Cl.
CPC ............ *E21B 47/00* (2013.01); *E21B 47/005* (2020.05); *E21B 47/007* (2020.05); *G01V 1/282* (2013.01);
(Continued)

(58) Field of Classification Search
None
See application file for complete search history.

(56) References Cited

U.S. PATENT DOCUMENTS 4,596,143 A * 6/1986 Norel ............... G01N 29/38
73/598
4,912,683 A * 3/1990 Katahara ............ G01B 17/02
367/25
(Continued)

FOREIGN PATENT DOCUMENTS

AU 2010235062 B2 * 2/2015 ............ E21B 47/10
WO 2015023386 A1 2/2015

OTHER PUBLICATIONS

International Application No. PCT/US2016/020632, International Written Opinion dated Nov. 29, 2016, 11 pages.
(Continued)

*Primary Examiner* — Isam A Alsomiri
*Assistant Examiner* — Jonathan D Armstrong
(74) *Attorney, Agent, or Firm* — DeLizio, Peacock, Lewin & Guerra, LLP

(57) ABSTRACT

The thickness of borehole casing can be determined by ultrasound logging in conjunction with simulations of ultrasonic plane-wave echo waveforms across a range of frequencies for a plurality of casing thicknesses and correlation of synthetic frequency spectra derived from the simulated plane-wave echo waveforms for the various casing thicknesses against the frequency spectrum of a measured pulse-echo waveform. In accordance with various embodiments, a portion of the measured pulse-echo waveform that corresponds to the first reflection off the interface between the borehole casing and the borehole fluid is used as a driving pulse to weight the simulated plane-wave echo waveforms in the synthetic frequency spectrum.

20 Claims, 7 Drawing Sheets

(51) Int. Cl.
  *G01V 1/28* (2006.01)
  *E21B 47/005* (2012.01)
  *E21B 47/007* (2012.01)

(52) U.S. Cl.
  CPC ............... *G01V 1/284* (2013.01); *G01V 1/50* (2013.01); *G01V 2210/1299* (2013.01); *G01V 2210/1429* (2013.01); *G01V 2210/43* (2013.01); *G01V 2210/614* (2013.01)

(56) References Cited

U.S. PATENT DOCUMENTS

| | | | |
|---|---|---|---|
| 5,216,638 A | 6/1993 | Wright | |
| 5,491,668 A | 2/1996 | Priest | |
| 5,663,502 A | 9/1997 | Nagashima et al. | |
| 5,763,773 A * | 6/1998 | Birchak | E21B 47/005 73/152.58 |
| 5,924,499 A * | 7/1999 | Birchak | E21B 47/14 175/40 |
| 6,041,861 A | 3/2000 | Mandal et al. | |
| 8,061,206 B2 | 11/2011 | Bolshakov et al. | |
| 2010/0263449 A1 | 10/2010 | Bolshakov et al. | |
| 2012/0143523 A1 * | 6/2012 | Chen | G01D 5/35316 702/42 |
| 2015/0322766 A1 * | 11/2015 | Veltman | E21B 44/00 340/853.6 |
| 2016/0041286 A1 * | 2/2016 | Sinha | G01F 1/668 73/152.32 |
| 2016/0102547 A1 * | 4/2016 | Ochoa | E21B 47/107 73/152.58 |
| 2016/0265349 A1 * | 9/2016 | Saulnier | E21B 47/16 |
| 2016/0290847 A1 * | 10/2016 | Gronsberg | G01F 1/663 |
| 2017/0199298 A1 * | 7/2017 | Hu | E21B 47/005 |
| 2019/0064387 A1 * | 2/2019 | Ohanian, III | E21B 47/06 |
| 2020/0190969 A1 * | 6/2020 | Ren | E21B 47/085 |

OTHER PUBLICATIONS

International Application No. PCT/US2016/020632, International Search Report dated Nov. 29, 2016, 3 pages.

* cited by examiner

CASING THICKNESS ESTIMATION BY FREQUENCY CORRELATION

BACKGROUND

Ultrasonic logging is routinely used in the oil and gas industry to inspect the casing and cement annulus in cased boreholes, determining, e.g., the thickness and condition of the casing and the pipe-to-cement bond quality. An ultrasonic logging tool disposed in the borehole may, for instance, use a rotating transducer and sensor (often implemented by the same component) to emit ultrasound signal pulses towards the casing and receive ultrasound echo signals reflected back from the casing, a technique known as the pulse-echo method. Ultrasound is reflected both at the interior surface and the exterior surface of the casing, resulting in dips in the received echo signal at frequencies corresponding to the fundamental resonance frequency of the casing and its higher harmonics. The casing thickness can generally be determined from measurements of these frequencies, which are thickness-dependent. For thick casing, however, this approach is not suitable. When thick casing is evaluated using a high-frequency transducer, the signal amplitude at and near the resonance frequency is very low. A low-frequency transducer, on the other hand, is challenging to design due to strong transducer ring-down (i.e., continuing transducer vibration beyond the duration of the received signal).

DETAILED DESCRIPTION

Described herein is an approach to casing-thickness determinations by ultrasound logging that involves simulating ultrasonic plane-wave echo waveforms across a range of frequencies for a plurality of casing thicknesses, and correlating synthetic frequency spectra derived from the simulated plane-wave echo waveforms for the various casing thicknesses against the frequency spectrum of a measured pulse-echo waveform. The casing thickness can then be determined based on the synthetic frequency spectrum that correlates best with the measured frequency spectrum. In accordance with various embodiments, a portion of the measured pulse-echo waveform that corresponds to the first reflection off the interface between the borehole casing and the borehole fluid contained therein is used as a driving pulse to weight the simulated plane-wave echo waveforms in the synthetic frequency spectrum. Beneficially, the disclosed approach provides a robust solution for casing thickness determinations regardless of the casing thickness (i.e., it is suitable for thick casings, such as casings with thicknesses in excess of 0.7 inches, as well as for thinner casings) and achieves high accuracy of the casing thickness determination (e.g., in some embodiments, an accuracy of 0.05 inches, and in some embodiments even of 0.02 inches).

Further, the approach is computationally efficient, allowing real-time processing applications, i.e., determinations of the casing thickness in real time or near-real time as the ultrasound logging tool passes through the borehole.

Various embodiments of ultrasonic logging tools, systems, and methods implementing this approach will hereinafter be described in more detail with reference to the accompanying drawings.

Figure 1:
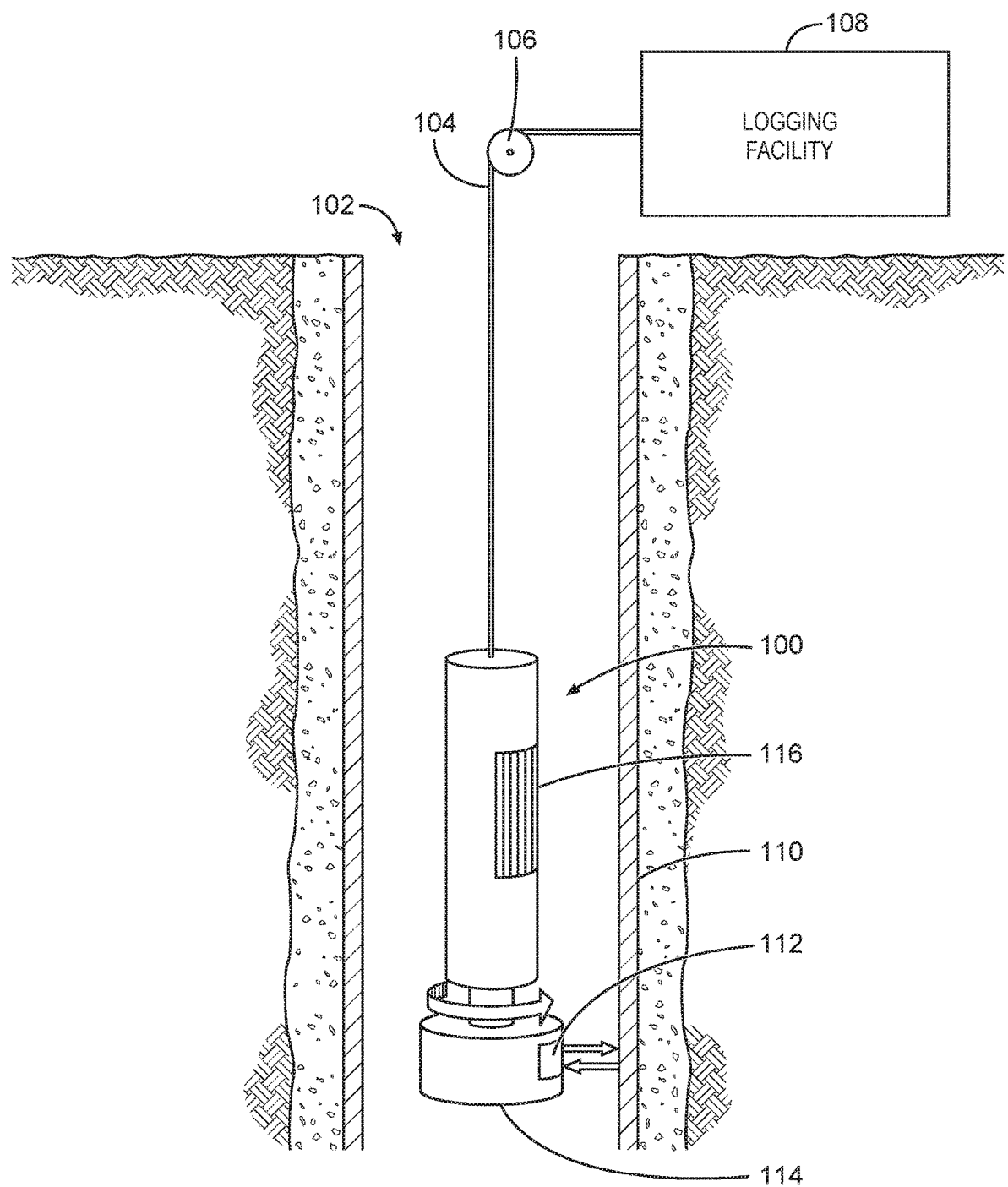
FIG. 1 is a diagram of an example ultrasonic logging tool disposed in a cased borehole, in accordance with various embodiments.

FIG. 1 is a diagram of an example ultrasonic logging tool 100 disposed in a cased borehole 102, in accordance with various embodiments. The logging tool 100 may be lowered into the borehole 102 on a wireline 104 wound around the winch 106 of, e.g., a logging truck. The wireline 104 is generally an electrical cable that, in addition to delivering the logging tool 100 downhole, may serve to transmit control signals and data telemetrically between the logging tool 100 and a logging facility 108 (implemented, e.g., with a suitably programmed computer) located above surface, e.g., inside the logging truck. Alternatively, the logging tool 100 may be conveyed to the borehole 102, for example and without limitation, by slick line, coiled tubing, or integrated into the bottom hole assembly of a drill string (e.g., to evaluate the casing of an upper borehole section prior to drilling the next section).

In some embodiments, the logging tool 100 is lowered to the bottom of the region of interest and subsequently pulled upward, e.g., at substantially constant speed. During this upward trip, instruments included in the logging tool 100 may perform measurements on the casing 110 as they pass by, or as the logging tool 100 remains stationary. The measurements may be communicated to the logging facility 108 (e.g., in real time) for processing and/or storage thereat. In this manner, a log, that is, a sequence of measurements correlated with the depths along the borehole 102 at which they are taken, is generated. Alternatively to transmitting the raw measurements uphole and processing them above surface, some or all of the processing may take place in suitable special-purpose or programmed general-purpose circuitry contained within the logging tool 100 itself, and the results (such as, e.g., the casing thickness as a function of depth) may be communicated uphole (e.g., in real time). As yet another alternative, the measurements may be stored in downhole memory contained within the logging tool 100, and processed following retrieval of the logging tool 100 from the borehole 102.

The ultrasonic logging tool 100 includes at least one ultrasonic transducer 112 (e.g., a piezoelectric transducer)

that emits acoustic waveforms towards the casing 110. The transducer 112 may be mounted on a continuously rotating tool segment 114 to achieve full azimuthal coverage of the casing 110. The rotational speed may be selected such that the angle of rotation during each measurement cycle (which generally includes emission of an ultrasonic wave and receipt of its reflection and may last, e.g., on the order of 100 µs) is small, e.g., less than 10° or less than 3°. Alternatively, multiple transducers 112 may be disposed at different azimuthal positions about the longitudinal tool axis to take measurements in different respective azimuthal sections. In pulsed-echo methods, the transducer(s) 112 may also serve as the sensor measuring the reflected ultrasonic waveform received from the casing. Alternatively, the logging tool 100 may include one or more separate sensors (e.g., located adjacent respective transmitting transducer(s) 112) for receiving the reflected waveforms. The logging tool 100 may further include a mud cell 116 for measuring the velocity of sound in the borehole fluid (e.g., mud), e.g., by measuring the time of flight between a transducer and a highly reflected (e.g., steel) target placed at a known distance. From the velocity of sound in the borehole fluid, the impedance of the borehole fluid (e.g., the mud impedance) can be computed, which, in turn, affects the amplitude of ultrasound reflections off the interface between the borehole fluid and the casing 110.

Figure 2:
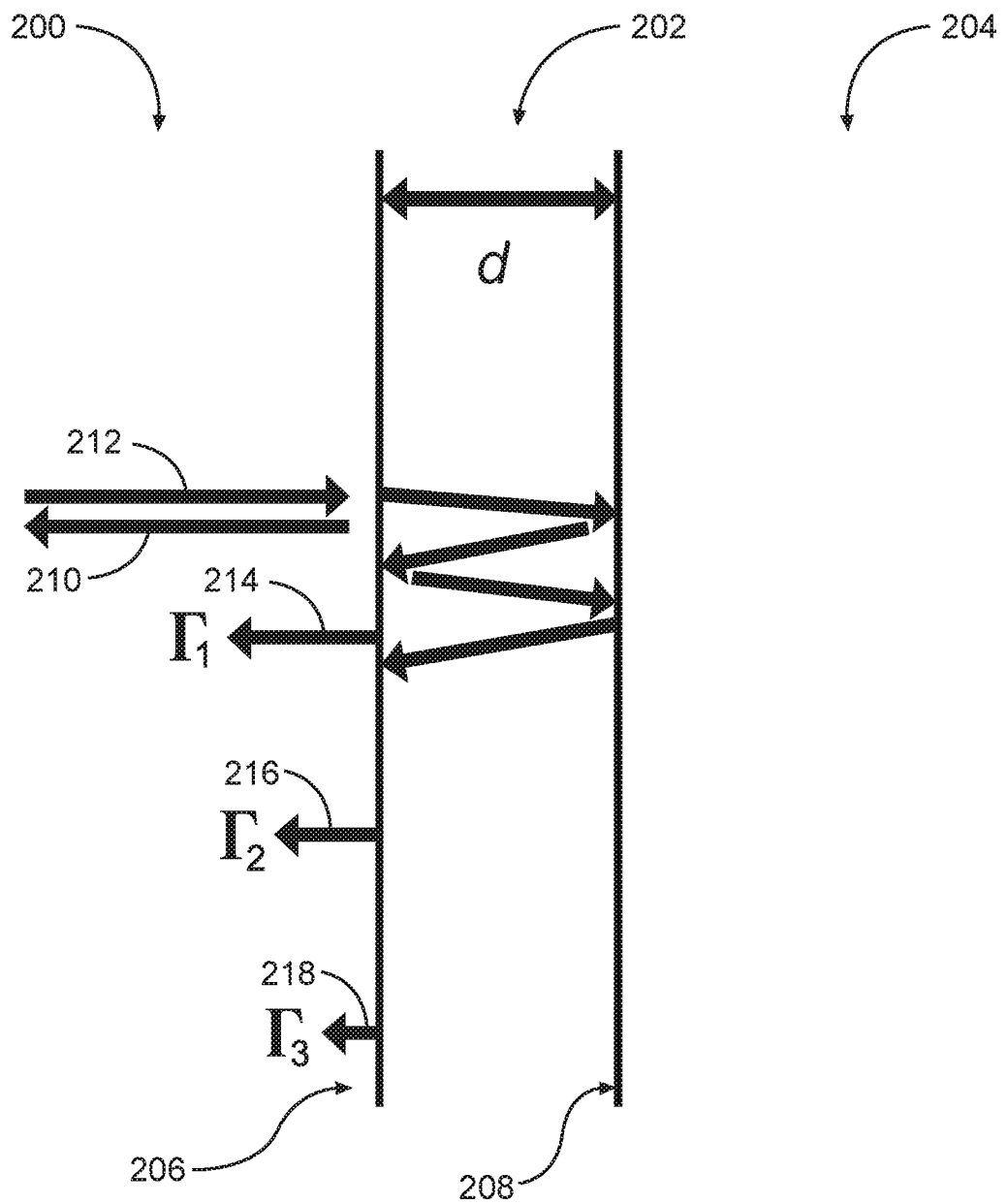
FIG. 2 is a schematic diagram of a three-layer model for simulating pulse-echo waveforms in accordance with various embodiments.

FIG. 2 is a schematic diagram of a three-layer model for simulating pulse-echo waveforms in accordance with various embodiments. The three layers 200, 202, 204 correspond to the mud or other borehole fluid interior to the casing, the casing, and the cement sheath surrounding the casing, respectively, and define a fluid-casing interface 206 and a casing-cement interface 208. Ultrasound is, in general, partially reflected at each of these interfaces 206, 208, resulting in an initial reflection 210 of the incident wave 212 at the fluid-casing interface 206 and multiple echo waves 214, 216, 218 (labeled $\Gamma_i$, where i stands for the i-th echo) resulting from one or more round trips through the casing layer 202.

Figure 3:
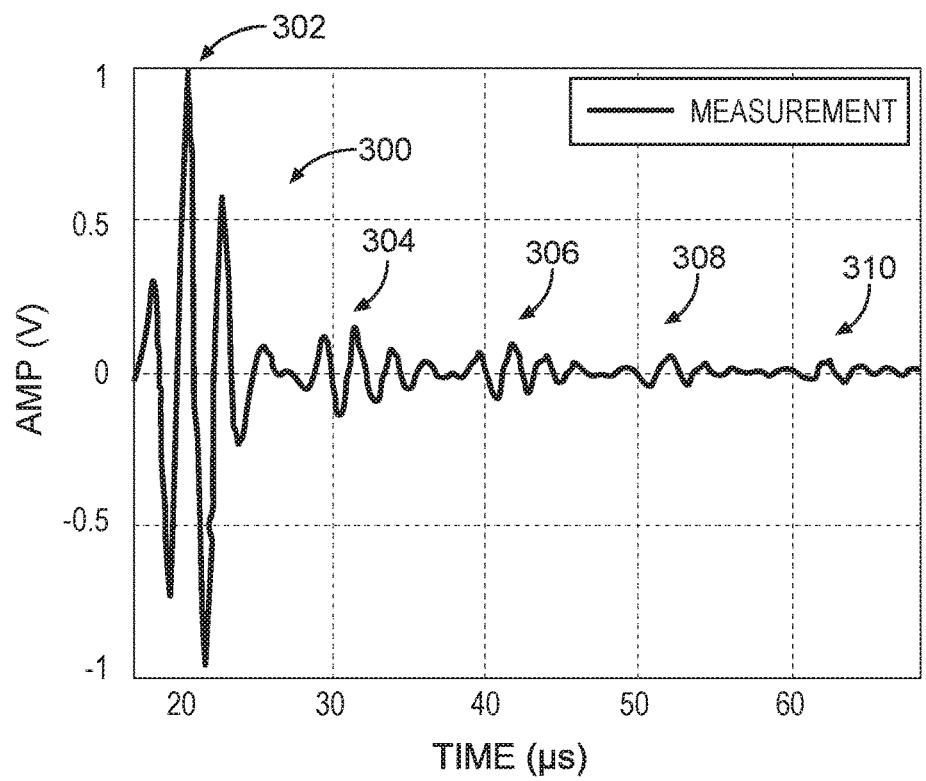
FIG. 3 is a graph of a pulse-echo waveform measured by an ultrasonic logging tool in a 1.17" thick casing, in accordance with an example embodiment.

FIG. 3 is a graph of an example pulse-echo waveform 300 measured by an ultrasonic logging tool 100 in a 1.17" thick casing. The waveform 300 shows the initial reflection 302 of the incident wave off the mud-casing interface 206, as well as multiple echoes 304, 306, 308, 310 occurring every 10 µs.

Figure 4:
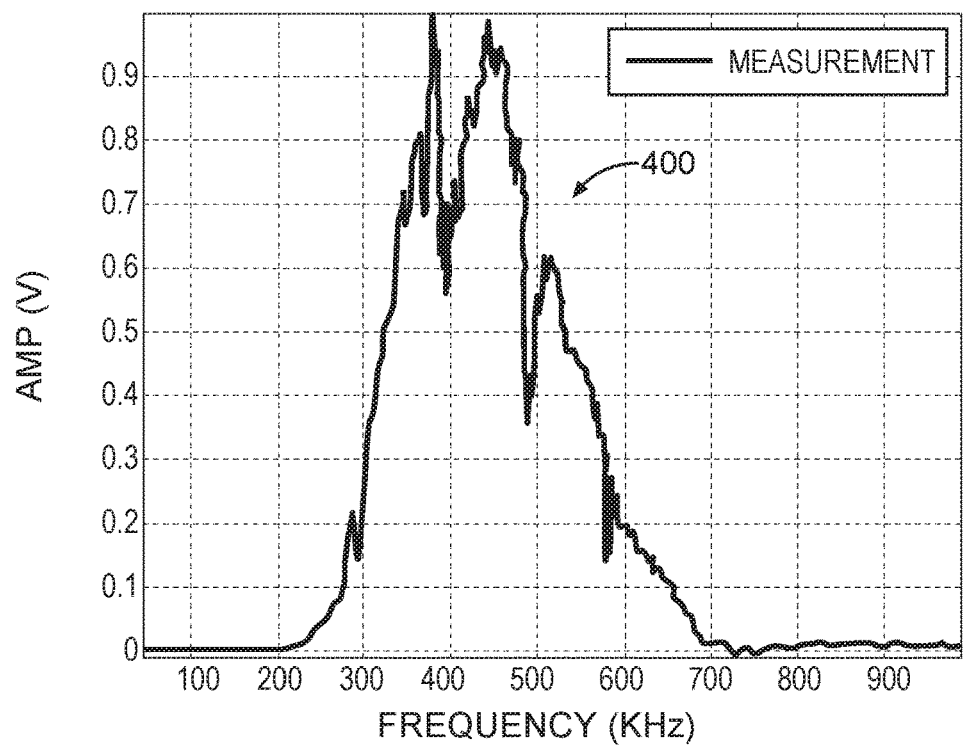
FIG. 4 is a graph of the frequency spectrum corresponding to the pulse-echo waveform of FIG. 3.

FIG. 4 is a graph of the frequency spectrum 400 corresponding to the pulse-echo waveform 300 of FIG. 3. The frequency spectrum 400 shows dips, or local minima, approximately at multiples of 100 KHz, consistent with the 10 µs interval between echoes in the time-dependent pulse-echo waveform 300. As can be seen, the higher harmonics of the fundamental resonance frequency at about 300 KHz, 400 KHz, and 500 KHz, which are due to the second through fourth echoes, are clearly discernible in the spectrum (whereas the fundamental frequency itself is not in this example). From the frequencies $f_n$ of the dips, where n corresponds to the order of the harmonics, and the sound velocity v in the casing, the thickness t of the casing can be determined from the following equation:

$$f_n = n \cdot \frac{v}{2 \cdot t}.$$

Figure 5:
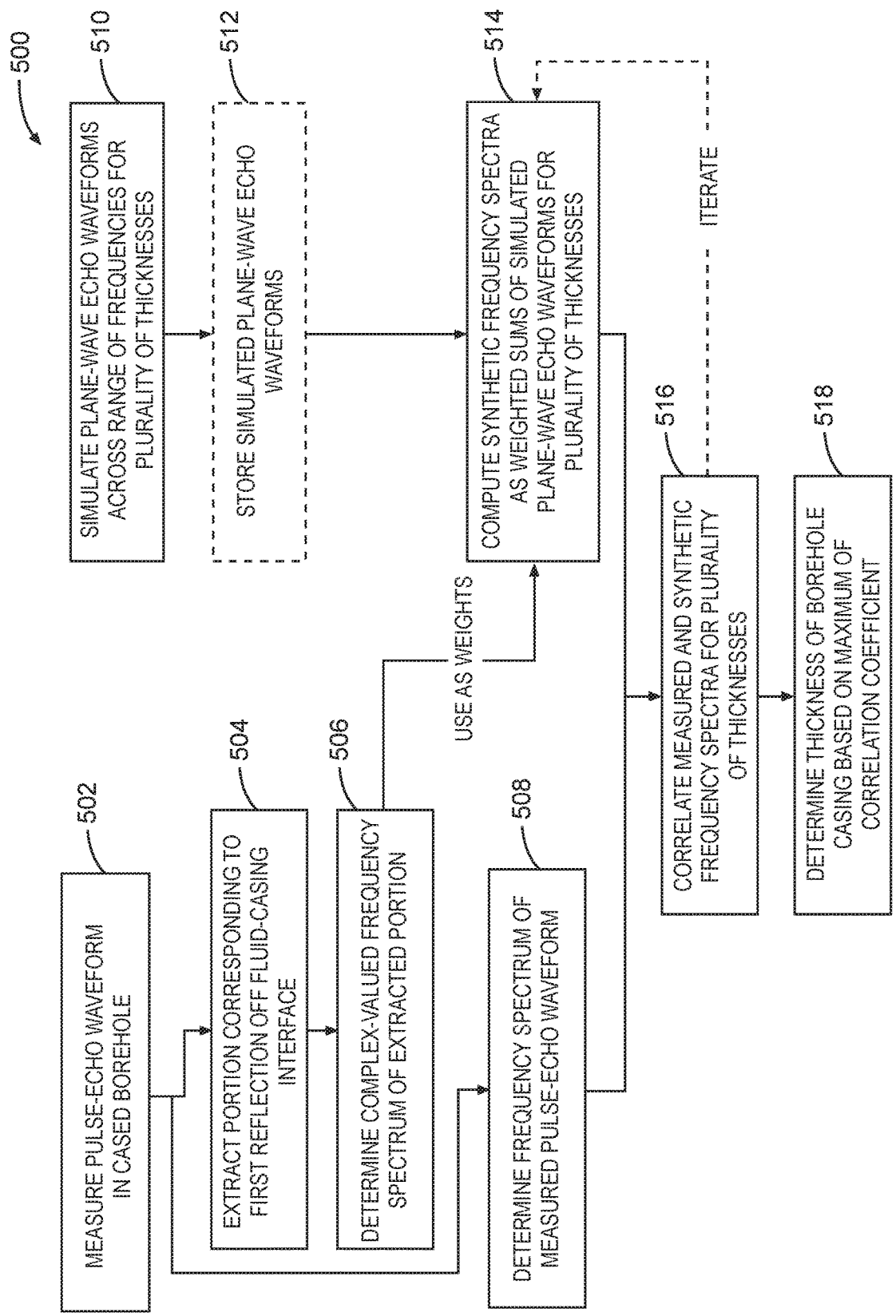
FIG. 5 is a flow chart of a method for determining the thickness of casing based on correlations between the frequency spectra obtained from measured and simulated pulse-echo waveforms, in accordance with various embodiments.

FIG. 5 is a flow chart of a method 500 for determining the thickness of casing based on correlations between the frequency spectra obtained from measured and simulated pulse-echo waveforms, in accordance with various embodiments. The method 500 involves using an ultrasonic logging tool 100 to measure a pulse-echo waveform inside a borehole casing (act 502). From the measured pulse-echo waveform, a portion corresponding to the first reflection off the fluid-casing interface 206, which is assumed to approximate the driving pulse emitted by the transducer 112, is extracted (act 504), and the complex-valued frequency spectrum of the extracted reflection portion is derived, e.g., by Fourier transform (act 506). In addition, the measured pulse-echo waveform in its entirety is Fourier-transformed (or otherwise converted to the frequency domain) to obtain the corresponding frequency spectrum (act 508).

In a separate prong, the method 500 further involves simulating plane-wave echo waveforms for a range of discrete frequencies (e.g., a range corresponding to the spectral range of the measured pulse-echo waveform) (act 510). For each frequency, the simulation results in a complex amplitude (i.e., real amplitude and phase) of the total reflected wave (including echoes). The simulation may be based on a (one-dimensional) three-layer model of the cased borehole, e.g., as illustrated in FIG. 2, and is generally performed for a plurality of casing thicknesses of the model. The velocity of sound in the borehole fluid, e.g., as measured with the mud cell 116, may be used as an input parameter of the simulation. In some embodiments, the simulated plane-wave echo waveforms are pre-computed and stored in memory (act 512) for subsequent retrieval during inversion of the measured pulse-echo waveform and its frequency spectrum; this is feasible under the assumption that the borehole-fluid (e.g., mud) properties and other input parameters of the simulation.

The inversion involves determining a synthetic frequency spectrum for each of a plurality of casing thicknesses by combining the complex amplitudes of the plane-wave echo waveforms simulated for the respective thickness into a weighted sum (act 514), with complex weights (reflecting the relative amplitudes and phase shifts between the plane-wave echo waveforms) determined in accordance with the frequency spectrum of the reflection portion extracted from the measured pulse-echo waveform. The synthetic frequency spectra for different casing thicknesses are correlated against the frequency spectrum obtained from the measured pulse-echo waveform (act 516), resulting in a correlation coefficient or similar suitable metric as a function of casing thickness. The thickness at which the correlation coefficient reaches its global maximum, i.e., for which simulation and measurement correlate best, is taken to be the thickness of the borehole casing (act 518). In some embodiments, the inversion is performed iteratively, and the local thickness-dependence of the correlation coefficient informs the selection of thicknesses for which further synthetic frequency spectra are to be computed.

Figure 6:
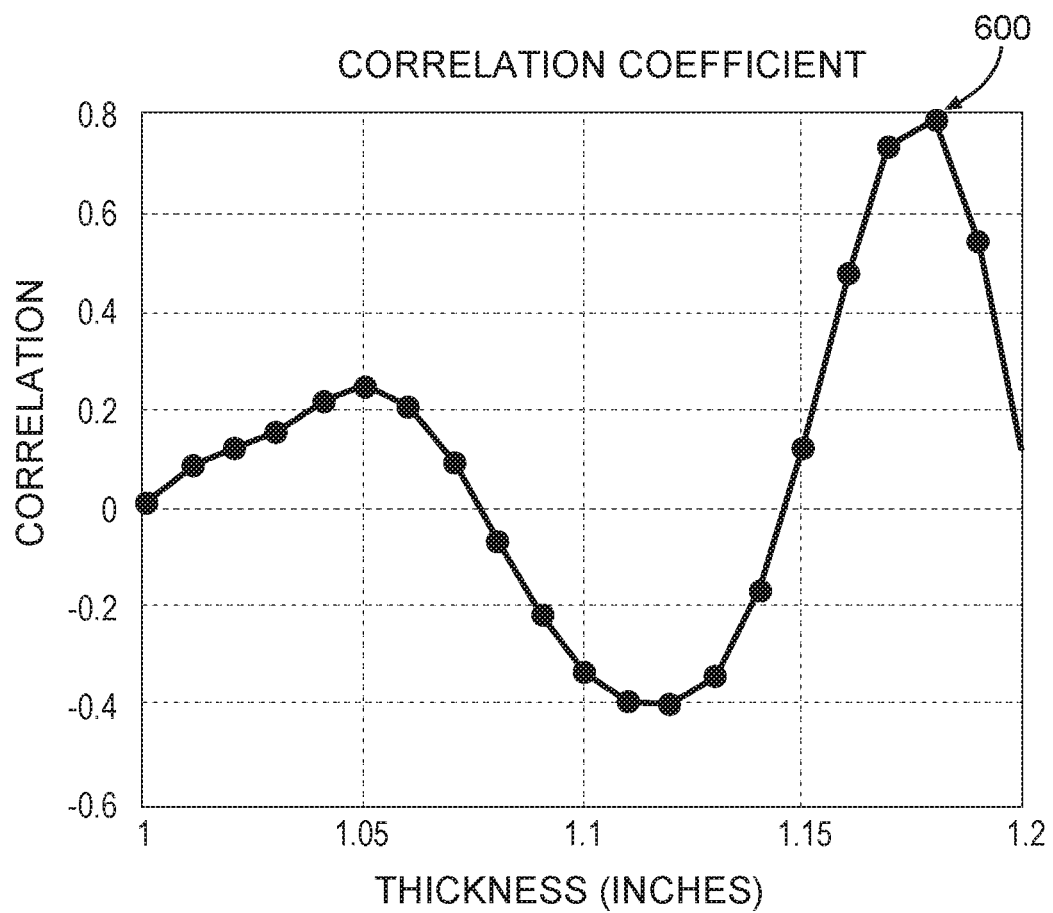
FIG. 6 is a graph of the correlation coefficient, plotted versus casing thickness, between synthetic frequency spectra computed for various casing thicknesses and a measured frequency spectrum obtained for 1.17" casing, in accordance with an example embodiment.

FIG. 6 is a graph of the correlation coefficient, plotted versus casing thickness, between synthetic frequency spectra computed for various casing thicknesses and a measured frequency spectrum obtained for 1.17" casing, in accordance with an example embodiment. As can be seen, the correlation coefficient assumes its global maximum 600 at a casing thickness of 1.17", as it should. In other words, among the synthetic frequency spectra computed for different casing thicknesses, the spectrum computed based on plane-wave echo waveform simulations for 1.17" thick casing matches the experimentally determined frequency spectrum best.

Figure 7:
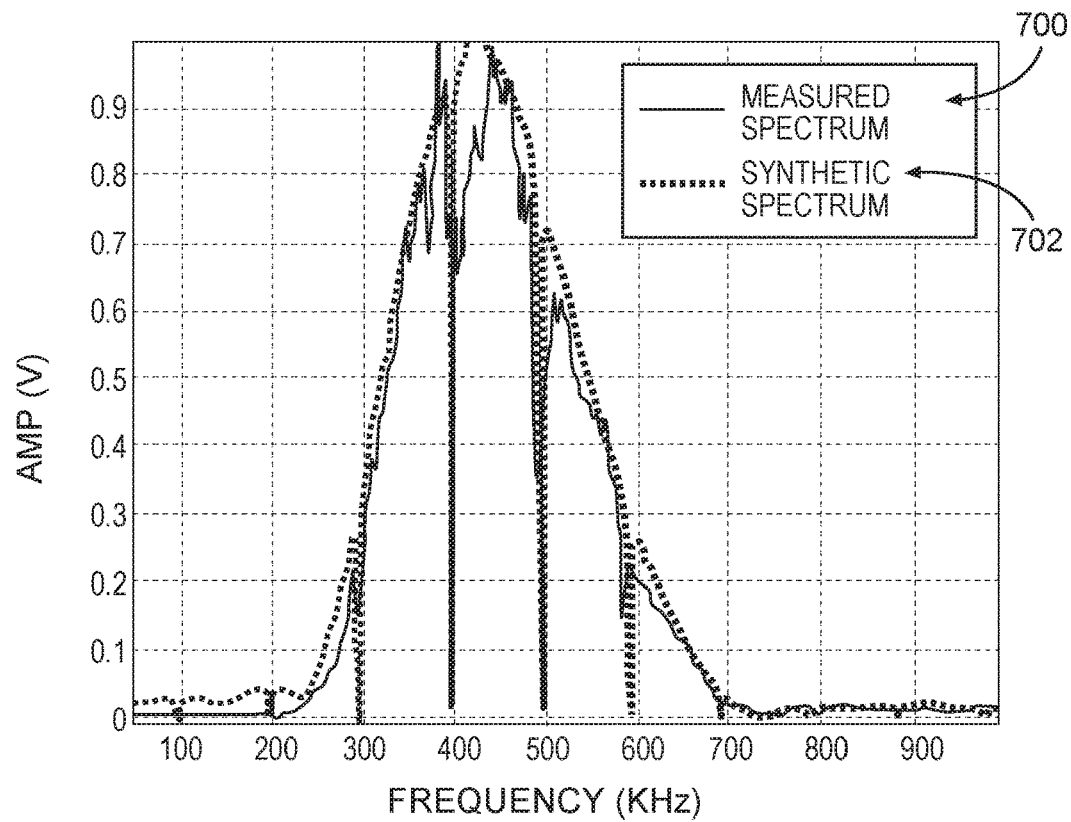
FIG. 7 is a graph of the synthetic and measured frequency spectra obtained for 1.17" thick casing, in accordance with an example embodiment.

FIG. 7 is a graph of the synthetic and measured frequency spectra obtained for 1.17" thick casing, illustrating good agreement between the two. The frequency spectrum 700 derived from the measured pulse-echo waveform is depicted with a solid line, and the synthetic frequency spectrum 702 is shown with a thicker, dashed line.

Figure 8:
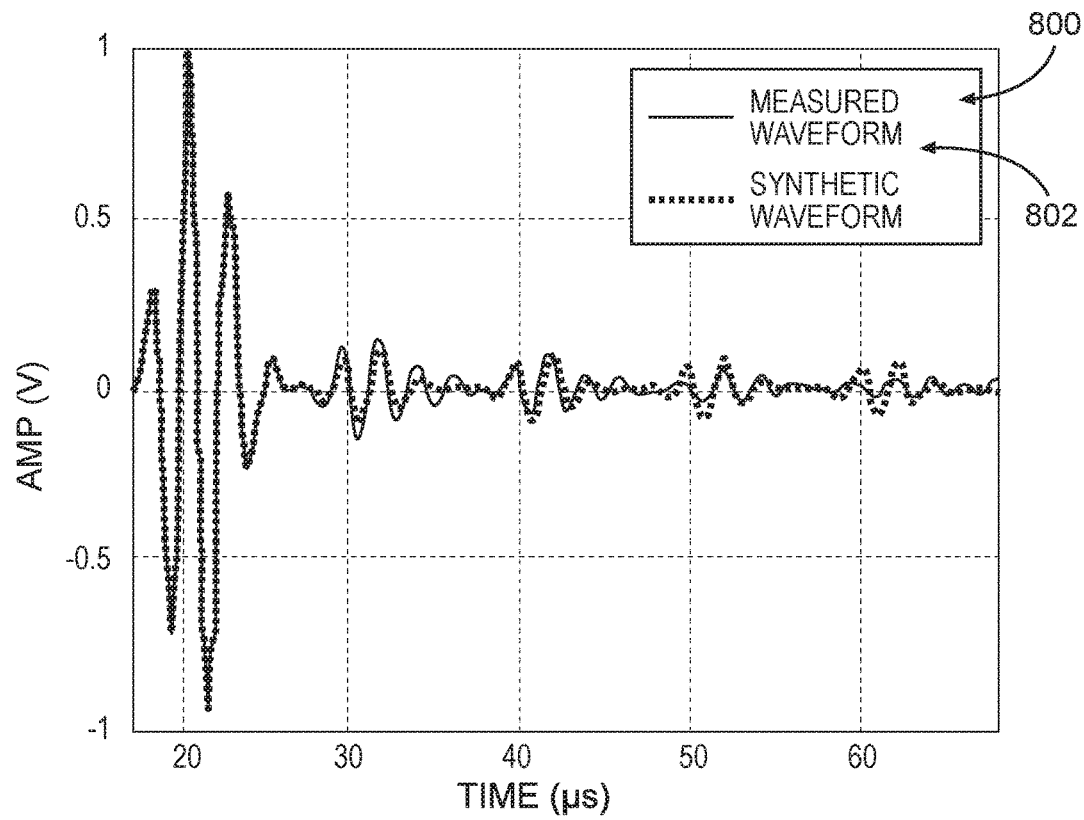
FIG. 8 is a graph of the time-dependent synthetic and measured pulse-echo waveforms obtained for 1.17" casing.

FIG. 8 is a graph of the time-dependent synthetic and measured pulse-echo waveforms obtained for 1.17" casing, which, consistently with FIG. 7, shows good agreement. Again, the measured pulse-echo waveform 800 is shown with a solid line, while the synthetic pulse-echo waveform 802 (computed as a weighted sum of the simulated pulse-echo waveforms for different frequencies) is shown with a thicker dashed line.

The processing functionality described herein (e.g., corresponding to acts 504-518 in FIG. 5) can generally be implemented with various combinations of computing hardware (circuitry) and/or software, such as special-purpose circuitry (e.g., a digital signal processor, application-specific integrated circuit, field-programmable gate array, etc.) and/or a suitably programmed general-purpose computer. Such hardware and/or software may reside in whole or in part in the logging tool 100 itself, and/or in a separate facility located above surface, such as the logging facility 108.

Figure 9:
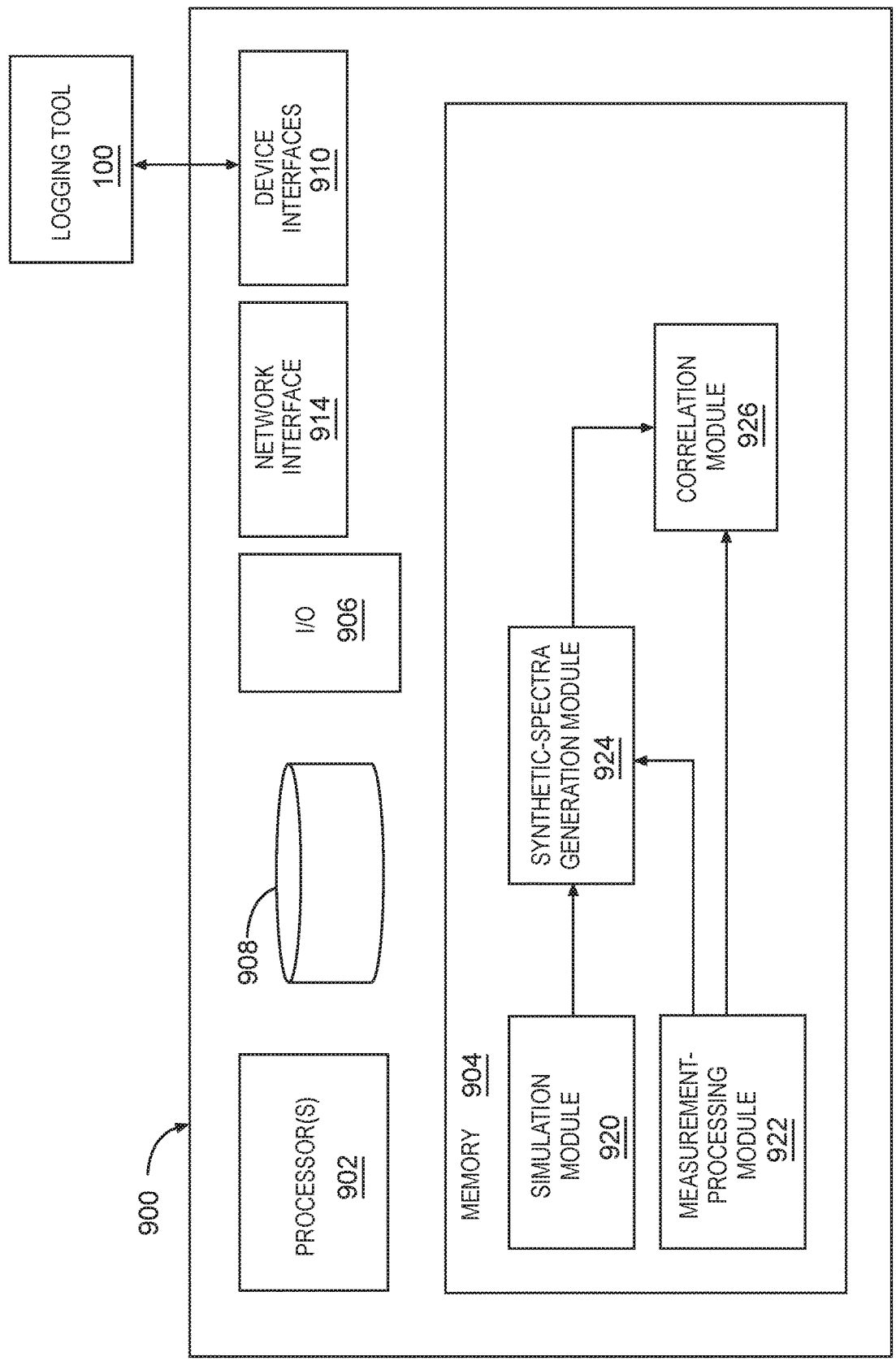
FIG. 9 is a block diagram of an example computing system for implementing the computational functionality of the method of FIG. 5, in accordance with various embodiments.

FIG. 9 is a block diagram of an example computing system 900 for implementing the computational functionality of the method of FIG. 5, in accordance with various embodiments. The computing system 900 includes one or more processors 902 (e.g., a conventional central processing unit (CPU), graphical processing unit, or other) configured to execute software programs stored in memory 904 (which may be, e.g., random-access memory (RAM), read-only memory (ROM), flash memory, etc.). Further, computing system 900 may include user input/output devices 906 (e.g., a screen, keyboard, mouse, etc.), permanent data-storage devices 908 (including, e.g., solid-state, optical, and/or magnetic machine-readable media such as hard disks, CD-ROMs, DVD-ROMs, etc.), device interfaces 910 for communicating directly or indirectly with the logging tool 100 or other measurement apparatus, a network interface 914 that facilitates communication with other computer systems and/or data repositories, and a system bus (not shown) through which the other components communicate.

The software programs stored in the memory 904 include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a simulation module 920 for computing the plane-wave echo waveforms based on a model of the cased borehole; a measurement-processing module 922 for extracting the first reflection from the measured pulse-echo waveform and converting the extracted portion and the waveform as a whole into the frequency domain; a synthetic-spectra generation module 924 for computing synthetic frequency spectra based on the simulated plane-wave echo waveforms in conjunction with the frequency spectrum of the extracted reflection portion; and a correlation module 926 for correlating the measured and synthetic spectra and finding the maximum of the correlation coefficient to determine the casing thickness. Of course, the depicted organization into modules is merely one non-limiting example of ways in which instructions that implement the disclosed functionality can be grouped.

The following numbered examples are illustrative embodiments:

1. A method comprising: measuring a pulse-echo waveform with an ultrasonic logging tool disposed interior to a borehole casing; extracting, from the measured pulse-echo waveform, a reflection portion corresponding to a reflection off an interface between the borehole casing and a borehole fluid contained within the borehole casing; computing, for each of a plurality of casing thicknesses, a synthetic frequency spectrum as a weighted sum of plane-wave echo waveforms simulated for the respective casing thickness across a range of frequencies, using the reflection portion extracted from the measured pulse-echo waveform as a driving pulse to weight the simulated plane-wave echo waveforms; correlating a frequency spectrum of the measured pulse-echo waveform with the synthetic frequency spectra computed for the plurality of thicknesses to obtain a correlation coefficient as a function of casing thickness; and determining a thickness of the borehole casing based on a maximum of the correlation coefficient.

2. The method of example 1, further comprising simulating the plane-wave echo waveforms for the plurality of casing thicknesses and across the range of frequencies.

3. The method of example 2, further comprising measuring a velocity of sound in the borehole fluid with a mud cell disposed interior to the borehole casing.

4. The method of example 3, wherein the measured velocity of sound in the borehole fluid is used in simulating the plane-wave echo waveforms.

5. The method of any of examples 2-4, wherein the plane-wave echo waveforms are simulated based on a three-layer model of the borehole fluid, the borehole casing, and cement surrounding the borehole casing.

6. The method of any of examples 1-5, wherein the frequency spectrum of the measured pulse-echo waveform is derived from the measured pulse-echo waveform by Fourier transform.

7. The method of any of examples 1-6, wherein the thickness of the borehole casing exceeds 0.7" and is determined with a margin of error of less than 0.05".

8. A system comprising: (i) an ultrasonic logging tool to measure a pulse-echo waveform in a borehole casing; and (ii) circuitry to process the measured pulse-echo waveform by extracting, from the measured pulse-echo waveform, a reflection portion corresponding to a reflection off an interface between the borehole casing and a borehole fluid contained within the borehole casing; computing, for each of a plurality of casing thicknesses, a synthetic frequency spectrum as a weighted sum of plane-wave echo waveforms simulated for the respective casing thickness across a range of frequencies, using the reflection portion extracted from the measured pulse-echo waveform as a driving pulse to weight the simulated plane-wave echo waveforms; correlating a frequency spectrum of the measured pulse-echo waveform with the synthetic frequency spectra computed for the plurality of thicknesses to obtain a correlation coefficient as a function of casing thickness; and determining a thickness of the borehole casing based on a maximum of the correlation coefficient.

9. The system of example 8, wherein the ultrasonic logging tool comprises a rotating ultrasonic transducer.

10. The system of example 8 or example 9, wherein the ultrasonic logging tool comprises a mud cell for measuring a velocity of sound in the borehole fluid.

11. The system of any of examples 8-10, wherein the circuitry is further configured to simulate the plane-wave echo waveforms.

12. The system of example 11, wherein the circuitry is configured to simulate the plane-wave echo waveforms based on a three-layer model of the borehole fluid, the borehole casing, and cement surrounding the borehole casing.

13. The system of any of examples 8-12, wherein the circuitry comprises memory storing the simulated plane-wave echo waveforms for the plurality of casing thicknesses across the range of frequencies.

14. The system of any of examples 8-12, wherein the circuitry is implemented in a surface logging facility.

15. A machine-readable medium storing instructions for processing pulse-echo waveforms measured in a borehole casing to determine a thickness of the borehole casing, the instructions, when executed by one or more processors of the machine, cause the one or more processors to extract, from the measured pulse-echo waveform, a reflection portion corresponding to a reflection off an interface between the borehole casing and a borehole fluid contained within the borehole casing; compute, for each of a plurality of casing thicknesses, a synthetic frequency spectrum as a weighted sum of plane-wave echo waveforms simulated for the respective casing thickness across a range of frequencies, using the reflection portion extracted from the measured pulse-echo waveform as a driving pulse to weight the simulated plane-wave echo waveforms; correlate a frequency spectrum of the measured pulse-echo waveform with the synthetic frequency spectra computed for the plurality of thicknesses to obtain a correlation coefficient as a function of casing thickness; and determine a thickness of the borehole casing based on a maximum of the correlation coefficient.

16. The machine-readable medium of example 15, wherein the instructions, when executed by the one or more processors, further cause the one or more processors to simulate the plane-wave echo waveforms for the plurality of casing thicknesses and across the range of frequencies.

17. The machine-readable medium of example 16, wherein the instructions, when executed by the one or more processors, further cause the one or more processors to use a measured velocity of sound in the borehole fluid when simulating the plane-wave echo waveforms.

18. The machine-readable medium of any of examples 15-17, wherein the instructions, when executed by the one or more processors, further cause the one or more processors to simulate the plane-wave echo waveforms based on a three-layer model of the borehole fluid, the borehole casing, and cement surrounding the borehole casing.

19. The machine-readable medium of any of examples 15-18, wherein the instructions, when executed by the one or more processors, further cause the one or more processors to derive the frequency spectrum of the measured pulse-echo waveform from the measured pulse-echo waveform by Fourier transform.

20. The machine-readable medium of any of examples 15-19, wherein the instructions, when executed by the one or more processors, cause the one or more processors to determine the thickness of the borehole casing with a margin of error of less than 0.05".

Many variations may be made in the tools, system, and methods described and illustrated herein without departing from the scope of the inventive subject matter. Accordingly, the described embodiments are not intended to limit the scope of the inventive subject matter. Rather, the scope of the inventive subject matter is to be determined by the scope of the following claims and all additional claims supported by the present disclosure, and all equivalents of such claims.

What is claimed is:

1. A method comprising:
measuring a pulse-echo waveform with an ultrasonic logging tool disposed interior to a borehole casing;
extracting, from the measured pulse-echo waveform, a reflection portion corresponding to a reflection off an interface between the borehole casing and a borehole fluid contained within the borehole casing;
computing, for each of a plurality of casing thicknesses, a synthetic frequency spectrum as a weighted sum of plane-wave echo waveforms simulated for the respective casing thickness across a range of frequencies, using the reflection portion extracted from the measured pulse-echo waveform as a driving pulse to weight the simulated plane-wave echo waveforms;
correlating a frequency spectrum of the measured pulse-echo waveform with the synthetic frequency spectra computed for the plurality of casing thicknesses to obtain a correlation coefficient as a function of casing thickness; and
determining a thickness of the borehole casing based on a maximum of the correlation coefficient.

2. The method of claim 1, further comprising simulating the plane-wave echo waveforms for the plurality of casing thicknesses and across the range of frequencies.

3. The method of claim 2, further comprising measuring a velocity of sound in the borehole fluid with a mud cell disposed interior to the borehole casing.

4. The method of claim 3, wherein the measured velocity of sound in the borehole fluid is used in simulating the plane-wave echo waveforms.

5. The method of claim 2, wherein the plane-wave echo waveforms are simulated based on a three-layer model of the borehole fluid, the borehole casing, and cement surrounding the borehole casing.

6. The method of claim 1, wherein the frequency spectrum of the measured pulse-echo waveform is derived from the measured pulse-echo waveform by Fourier transform.

7. The method of claim 1, wherein the thickness of the borehole casing exceeds 0.7" and is determined with a margin of error of less than 0.05".

8. A system comprising:
an ultrasonic logging tool to measure a pulse-echo waveform in a borehole casing; and
circuitry to process the measured pulse-echo waveform by extracting, from the measured pulse-echo waveform, a reflection portion corresponding to a reflection off an interface between the borehole casing and a borehole fluid contained within the borehole casing;
computing, for each of a plurality of casing thicknesses, a synthetic frequency spectrum as a weighted sum of plane-wave echo waveforms simulated for the respective casing thickness across a range of frequencies, using the reflection portion extracted from the measured pulse-echo waveform as a driving pulse to weight the simulated plane-wave echo waveforms;
correlating a frequency spectrum of the measured pulse-echo waveform with the synthetic frequency spectra computed for the plurality of casing thicknesses to obtain a correlation coefficient as a function of casing thickness; and
determining a thickness of the borehole casing based on a maximum of the correlation coefficient.

9. The system of claim 8, wherein the ultrasonic logging tool comprises a rotating ultrasonic transducer.

10. The system of claim 8, wherein the ultrasonic logging tool comprises a mud cell for measuring a velocity of sound in the borehole fluid.

11. The system of claim 8, wherein the circuitry is further configured to simulate the plane-wave echo waveforms.

12. The system of claim 11, wherein the circuitry is configured to simulate the plane-wave echo waveforms based on a three-layer model of the borehole fluid, the borehole casing, and cement surrounding the borehole casing.

13. The system of claim 8, wherein the circuitry comprises memory storing the simulated plane-wave echo waveforms for the plurality of casing thicknesses across the range of frequencies.

14. The system of claim 8, wherein the circuitry is implemented in a surface logging facility.

15. A machine-readable medium storing instructions for processing pulse-echo waveforms measured in a borehole casing to determine a thickness of the borehole casing, the instructions, when executed by one or more processors, cause the one or more processors to
   extract, from the measured pulse-echo waveform, a reflection portion corresponding to a reflection off an interface between the borehole casing and a borehole fluid contained within the borehole casing;
   compute, for each of a plurality of casing thicknesses, a synthetic frequency spectrum as a weighted sum of plane-wave echo waveforms simulated for the respective casing thickness across a range of frequencies, using the reflection portion extracted from the measured pulse-echo waveform as a driving pulse to weight the simulated plane-wave echo waveforms;
   correlate a frequency spectrum of the measured pulse-echo waveform with the synthetic frequency spectra computed for the plurality of casing thicknesses to obtain a correlation coefficient as a function of casing thickness; and
   determine a thickness of the borehole casing based on a maximum of the correlation coefficient.

16. The machine-readable medium of claim 15, wherein the instructions, when executed by the one or more processors, further cause the one or more processors to simulate the plane-wave echo waveforms for the plurality of casing thicknesses and across the range of frequencies.

17. The machine-readable medium of claim 16, wherein the instructions, when executed by the one or more processors, further cause the one or more processors to use a measured velocity of sound in the borehole fluid when simulating the plane-wave echo waveforms.

18. The machine-readable medium of claim 15, wherein the instructions, when executed by the one or more processors, further cause the one or more processors to simulate the plane-wave echo waveforms based on a three-layer model of the borehole fluid, the borehole casing, and cement surrounding the borehole casing.

19. The machine-readable medium of claim 15, wherein the instructions, when executed by the one or more processors, further cause the one or more processors to derive the frequency spectrum of the measured pulse-echo waveform from the measured pulse-echo waveform by Fourier transform.

20. The machine-readable medium of claim 15, wherein the instructions, when executed by the one or more processors, cause the one or more processors to determine the thickness of the borehole casing with a margin of error of less than 0.05".

* * * * *